2,767,186
Patented Oct. 16, 1956

2,767,186

QUATERNARY AMMONIUM SALTS OF SUBSTITUTED BENZHYDRYL PIPERAZINES AND METHOD OF MAKING

Richard Baltzly and Walter S. Ide, Tuckahoe, and Emil Lorz, Yonkers, N. Y., assignors to Burroughs Wellcome & Co. (U. S. A.) Inc., Tuckahoe, N. Y., a corporation of New York No Drawing. Application February 3, 1954, Serial No. 408,017

9 Claims. (Cl. 260—268)

This invention relates to novel quaternary ammonium salts having unusual properties in human and veterinary medicines. The compounds represent a new group of derivatives of the following formula I. 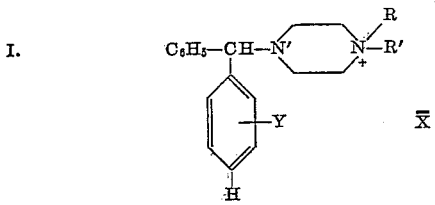

wherein R and R' are lower alkyl groups, $\overline{X}$ is an anion and Y is a substituent radical selected from the class consisting of the lower alkyl and the lower alkoxy radicals and the halogens. It will be seen that these are in effect mono-quaternary salts of ortho- and meta-substituted benzhydryl piperazines. The quaternizing of compounds of this formula has not been attempted and the development of valuable properties in the quaternary ammonium salts was entirely unexpected.

These compounds exhibit marked atropine-like potency in inhibiting the spasmogenic action of acetylcholine on smooth muscle and are consequently of value as spasmolytics. In certain respects they represent a marked departure from previous practice in medicinal chemistry. Examination of papers, patents and reviews on spasmolytic substances reveals a general belief that substitution in a benzene ring of a spasmolytic type of compound diminishes its activity and is consequently undesirable. Investigation of quaternary salts of benzhydryl piperazines has revealed that this belief is indeed justified as regards para substitution. The quaternary salts corresponding to various p-substituted benzhydryl-N'-alkyl piperazines, some of which are highly effective antihistaminics are nearly devoid of spasmolytic activity. Whereas N,N'-dimethyl-N'-benzhydryl piperazinium iodide II. 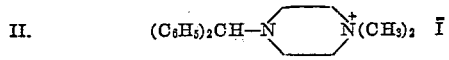

is a weakish spasmolytic having about 7% the activity of atropine, the corresponding para-chloro compound is less than 1% as potent as atropine. On the other hand the o-methyl compound Formula I, Y=o-methyl; R=R'=methyl) is only slightly less active than atropine. Chlorine and bromine in the ortho position result in even greater accentuations of potency.

The compounds of the present invention are prepared by quaternation of the appropriate N-benzhydryl-N'-alkyl piperazines which in turn are formed by reaction of a benzhydryl chloride with an N'-alkyl piperazine as described in U. S. Patent No. 2,630,435. The compounds of Examples 5, 6 and 8 of that patent, while impotent as antihistaminics, are precursors of exceedingly active spasmolytics. The preparations of o-methoxy and m-ethoxy-benzhydryl-N'-methyl piperazines are also described by Baltzly, Dubreuil, Ide and Lorz, J. Org. Chem., 14, 775 (1949).

When, in Formula I, R and R' are both ethyl or when one is isopropyl, the use of N'-ethyl piperazine and N'-isopropyl piperazine is necessary or desirable. Isopropyl piperazines may be prepared in good yield by catalytic reduction of carbethoxypiperazine in the presence of acetone, preferably with a platinized charcoal catalyst, followed by hydrolysis of the ester function. Although N'-ethylpiperazine is a known compound and can be prepared by known methods, a somewhat simpler synthesis is achieved by reacting piperazine in alcohol with an ethylating agent (ethyl iodide, ethyl bromide or ethyl sulfate) adding inorganic base and then an excess of ethyl chlorocarbonate. The reaction mixture then contains N,N'-diethylpiperazine, N-carbethoxy-N'-ethyl piperazine and N,N'-dicarbethoxy piperazine which are readily separated from each other, the middle compound being hydrolyzable to ethyl piperazine.

Quaternization of the nitrogen atom furthest removed from the benzhydryl portion takes place quite readily with lower alkyl bromides and iodides in acetone solvent. On a larger scale the use of alkyl chlorides is desirable both for reasons of economy and as giving directly a chloride salt. In this case methanol is the most desirable solvent since, as is well known, it permits a more rapid quaternization. The use of pressure apparatus and application of somewhat more elevated temperatures also becomes desirable.

Alternatively, iodides may be converted to chlorides by the action of silver chloride.

In general, the anion contributes nothing to the physiological action of these compounds and all salts of pharmaceutically acceptable acids are considered to be equivalent to each other. This application is a continuation in part of our earlier application Serial No. 287,604, filed May 13, 1952.

EXAMPLE 1

(a) *o-Methylbenzhydryl chloride*

A benzene solution of 64 g. of o-methylbenzhydrol to which had been added about 20 g. of calcium chloride was saturated with gaseous hydrogen chloride. The solution was allowed to stand overnight while a slow stream of hydrogen chloride was passed through and was then decanted from the calcium chloride. The benzene was evaporated and the product distilled; B. P. 148–149° C. at 3 mm. pressure.

(b) *N-ethyl-N'-(o-methylbenzhydryl) piperazine*

One-twentieth mole (10.8 g.) of o-methylbenzhydryl chloride was added to 11.4 g. (0.1 mole) of N-ethyl-piperazine and the resultant solution was heated on the steam bath overnight. The reaction mixture was cooled, partitioned between ether and water, and the ethereal layer was washed with water until the washings were neutral. The ethereal layer was then extracted with N-hydrochloric acid and the extracts were basified and extracted with ether. After drying over potassium carbonate, the ether was evaporated, leaving the product in a state pure enough for the next step. Complete purification can be achieved by distillation at 1 mm. vacuum or by recrystallization of the dihydrochloride.

(c) *N,N-diethyl-N'-(o-methylbenzhydryl) piperazinium iodide*

To 4.4 g. of the crude base above dissolved in 25 cc. of acetone, was added 3.9 g. of ethyl iodide and the solution was kept at about 40° C. for twenty-four hours during which the quaternary salt separated as a crystalline solid. It was recrystallized twice from absolute ethanol and then melted at 242° C.

Similar treatement with ethyl bromide afforded the corresponding bromide, melting at 258°.

The chloride was prepared with identical properties by dissolving the iodide in warm water and stirring over freshly precipitated silver chloride in a flask protected from the light for 4 hours, followed by filtration and evaporation of the filtrate in vacuo, and by reaction of the tertiary base with ethyl chloride in methanol solution for 8 hours at 89° C. in an autoclave, followed by evaporation of most of the solvent and precipitation with ether.

EXAMPLE 2

*N-methyl-N-isopropyl-N'-(o-bromobenzhydryl) piperazinium iodide*

Isopropyl iodide (1.9 g.) and N-methyl-N'-(o-bromobenzhydryl) piperazine (2.6 g.) were dissolved in 20 cc. of acetone and heated at 40° C. for two days. The crystalline quaternary salt was collected and recrystallized from absolute ethanol, it melted at 216° C.

EXAMPLE 3

*N-methyl-N-ethyl-N'-(o-chlorobenzhydryl) piperazinium iodide*

N-methyl-N'-(o-chlorobenzhydryl) piperazine (2.7 g.) and 2.2 g. of ethyl iodide were reacted together by the method of Example 1. The recrystallized product melted at 232° C.

By the method of Example 1 the following salts were also prepared:

1. N-methyl-N-ethyl-N'-(o - methylbenzhydryl) piperazinium iodide, M. P. 190° C.
2. N,N-dimethyl-N'-(o-methylbenzhydryl) piperazinium iodide, M. P. 204° C.
3. N-methyl-N-isopropyl-N' - (o - chlorobenzhydryl) piperazinium iodide, M. P. 236° C.
4. N-methyl-N-ethyl-N'-(m - chlorobenzhydryl) piperazinium iodide, M. P. 210° C.
5. N,N-diethyl-N'-(m - chlorobenzhydryl) piperazinium iodide, M. P. 238° C.
6. N,N - dimethyl - N' - (m - methylbenzhydryl) piperazinium iodide, M. P. 218° C.
7. N-methyl-N-ethyl-N'-(m - methylbenzhydryl) piperazinium iodide, M. P. 212° C.
8. N-methyl-N-ethyl-N'-(o-methoxybenzhydryl) piperazinium iodide, M. P. 188° C.
9. N-methyl-N-ethyl-N'-(m - ethoxybenzhydryl) piperazinium iodide, M. P. 194° C.
10. N-methyl-N-ethyl-N' - (o - bromobenzhydryl) piperazinium iodide, M. P. 254° C.
11. N,N-diethyl-N'-(m - methylbenzhydryl) piperazinium iodide, M. P. 236° C.

We claim:
1. A compound represented by the formula:

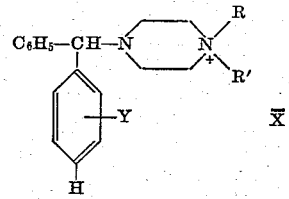

wherein $\overline{X}$ is the anion of a pharmaceutically acceptable acid, R and R' are lower alkyl groups and Y is a radical selected from the class consisting of the lower alkyl and lower alkoxy radicals, chlorine and bromine.

2. A therapeutically acceptable N,N lower dialkyl-N'-o-chlorobenzhydryl piperazinium salt.
3. A therapeutically acceptable N,N lower dialkyl-N'-o-bromobenzhydryl piperazinium salt.
4. A therapeutically acceptable N,N-diethyl-N-(o-methylbenzhydryl) piperazinium salt.
5. A therapeutically acceptable N-methyl-N-isopropyl-N'-(o-bromobenzhydryl) piperazinium salt.
6. A therapeutically acceptable N-methyl-N-ethyl-N'-(o-chlorobenzhydryl) piperazinium salt.
7. A therapeutically acceptable N,N-dimethyl-N'-(m-methylbenzhydryl) piperazinium salt.
8. A therapeutically acceptable N-methyl-N-ethyl-N'-(o-methoxybenzhydryl) piperazinium salt.
9. The process of preparing compounds of the formula

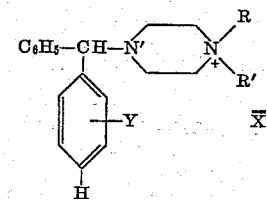

wherein $\overline{X}$ is the anion of a pharmaceutically acceptable acid, R and R' are lower alkyl groups and Y is a radical selected from the class consisting of the lower alkyl and lower alkoxy radicals, chlorine and bromine, which comprises reacting a compound selected from the class consisting of a base of the formula

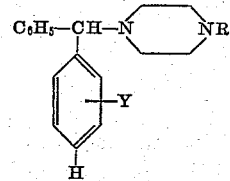

and its acid addition salts, with a quaternizing reagent of the formula R'X, wherein X is the anion of a pharmaceutically acceptable acid, and recovering the product.

References Cited in the file of this patent

FOREIGN PATENTS 996,427     France     Dec. 19, 1951

OTHER REFERENCES

Baltzly et al.: J. Org. Chem. 14, 775–782 (1949).